United States Patent
Beutin et al.

(10) Patent No.: US 7,966,833 B2
(45) Date of Patent: Jun. 28, 2011

(54) TURBINE ENGINE WITH A POWER TURBINE EQUIPPED WITH AN ELECTRIC POWER GENERATOR CENTERED ON THE AXIS OF THE TURBINE ENGINE

(75) Inventors: Bruno Albert Beutin, Evry (FR); Antoine Olivier Francois Colin, Brunoy (FR); Clarisse Savine Mathilde Reaux, Saint Martin de Bossenay (FR); Didier Jean-Louis Yvon, Savigny sur Orge (FR)

(73) Assignee: SNECMA, Paris (FR)

( * ) Notice: Subject to any disclaimer, the term of this patent is extended or adjusted under 35 U.S.C. 154(b) by 0 days.

(21) Appl. No.: 12/648,696

(22) Filed: Dec. 29, 2009

(65) Prior Publication Data

US 2010/0186418 A1 Jul. 29, 2010

(30) Foreign Application Priority Data

Jan. 23, 2009 (FR) ..................................... 09 50409

(51) Int. Cl.
*F02C 6/00* (2006.01)
(52) U.S. Cl. ........................................................ 60/802
(58) Field of Classification Search ................. 60/226.1, 60/244, 785, 802, 224, 225; 290/52; 310/67 R; 415/121.1, 121.2
See application file for complete search history.

(56) References Cited

U.S. PATENT DOCUMENTS

| | | | | |
|---|---|---|---|---|
| 3,834,161 A | * | 9/1974 | Quigley et al. | 60/244 |
| 4,892,269 A | * | 1/1990 | Greco et al. | 244/53 R |
| 4,927,329 A | * | 5/1990 | Kliman et al. | 416/127 |
| 4,936,748 A | * | 6/1990 | Adamson et al. | 416/123 |
| 5,376,827 A | | 12/1994 | Hines | |
| 7,721,555 B2 | * | 5/2010 | Sharp et al. | 60/802 |
| 2006/0096272 A1 | * | 5/2006 | Baughman et al. | 60/232 |
| 2006/0254255 A1 | | 11/2006 | Okai et al. | |

FOREIGN PATENT DOCUMENTS

| | | |
|---|---|---|
| EP | 1 655 474 A2 | 5/2006 |
| FR | 2 639 609 | 6/1990 |
| FR | 2 914 697 | 10/2008 |

OTHER PUBLICATIONS

U.S. Appl. No. 12/648,701, filed Dec. 29, 2009, Beutin, et al.

* cited by examiner

*Primary Examiner* — Michael Cuff
*Assistant Examiner* — Phutthiwat Wongwian
(74) *Attorney, Agent, or Firm* — Oblon, Spivak, McClelland, Maier & Neustadt, L.L.P.

(57) ABSTRACT

A turbine engine for an aircraft is disclosed. The engine includes a gas generator and a receiver driven by a power turbine. The receiver includes a propeller driven by a free power turbine provided with an outer case. The propeller includes a propeller case located radially outwards relatively to the outer case, and from which blades protrude radially outwards. The engine also includes an electric power generator. The rotor of the generator is centered on the longitudinal axis of the turbine engine, and is driven into rotation by the power turbine while being attached on the propeller case.

13 Claims, 2 Drawing Sheets

US 7,966,833 B2

TURBINE ENGINE WITH A POWER TURBINE EQUIPPED WITH AN ELECTRIC POWER GENERATOR CENTERED ON THE AXIS OF THE TURBINE ENGINE

TECHNICAL FIELD

The present invention generally relates to the field of aircraft turbine engines with an electric power generator.

The invention relates to any kind of turbine engine, the receiver of which is driven by one or more either free or attached power turbines.

STATE OF THE PRIOR ART

From the prior art it is known how to implement an electric generator on a turbine engine, with the purpose of electrically powering equipment with the produced power. These known pieces of equipment may be electrical pieces of equipment of a turbine engine and/or of the aircraft.

Usually, the mechanical power required for setting the rotor of the electric generator into rotation is picked up on the high pressure body, and more specifically on a radial shaft of the high pressure compressor.

Nevertheless, as the needs in electric power are becoming increasingly consequent, in particular owing to the electrification of aircrafts and of their turbine engines, the mechanical power to be picked up on the high pressure compressor may become critical, because it is too large. Indeed, excessive mechanical power picked up on the high pressure compressor may affect the operability of the turbine engine, the pumping margins may no longer be satisfactory under certain flight conditions, notably in the idling phases of the turbine engine. Moreover this drawback is still greater when the compressor has a small diameter, which in particular is the case on so-called "open rotor" (non-faired rotor) turbine engines.

SUMMARY OF THE INVENTION

The object of the invention is therefore to find at least a partial remedy to the drawback mentioned above, relating to the achievements of the prior art.

To do this, the object of the invention is a turbine engine for an aircraft comprising a gas generator as well as a receiver driven by a power turbine, said receiver comprising a first propeller driven by a first free power turbine provided with an outer case, said first propeller having a propeller case located radially outwards with respect to said outer case, and from which blades protrude radially outwards. According to the invention, the turbine engine comprises an electric power generator, the rotor of which, centred on the longitudinal axis of the turbine engine, is driven into rotation by said first power turbine while being attached on said propeller case.

Thus, the invention is remarkable in that the picking up of mechanical power is carried out on the free power turbine driving the receiver and fed with gas by the gas generator. This entirely eradicates the risk of thermodynamic disequilibrium likely to be produced within the gas generator, notably because of the fact that the free nature of the power turbine makes it mechanically independent of the gas generator. Actually, an increase in the total power available on the receiver, corresponding to the power dedicated to the electric generator and to the power dedicated to the thrust, simply causes a global increase in the temperature and pressure characteristics required for the gas generator. In particular, the pumping margins remain satisfactory under all flight conditions, even in the case when the gas generator comprises components of small diameters, such as this is the case on so-called "open rotor" turbine engines forming a preferential application of the present invention.

On the other hand, as mentioned above, said first propeller has a propeller case from which blades protrude radially outwards, and said rotor of the electric generator is attached on said propeller case. The generator then has a very large diameter improving its performances.

In such a configuration, it is preferably provided that said propeller case be found in the aerodynamic continuity of an outer nacelle skin of said turbine engine, as this is usually the case on open rotor turbine engines, this outer skin fixedly bearing the stator of the electric power generator.

Said electric power generator may equally be of the type with axial or radial flow, the latter case being preferentially retained for generator rotors of smaller diameters.

Preferably, said receiver comprises a second propeller driven by a second free or attached power turbine, the first and second propellers being counter-rotating. Alternatively, both propellers may be driven in the same direction of rotation, without departing from the scope of the invention.

Preferably, each of the first and second propellers is driven by its associated power turbine, directly or via a reduction gear, or any other mechanical transmission system.

Preferably, said gas generator is with a dual body, and comprises a high pressure compressor equipped with a radial shaft driving the rotor of an additional electric power generator. Therefore, the required electric power is advantageously produced by at least two distinct generators, thereby limiting the total power which each of them has to provide. In particular, the additional generator preferably only produces a portion of the required electric power, so that its implementation does not affect the operability of the turbine engine. Its size may therefore be reduced with respect to that of the generators of the prior art provided in the same location.

Finally, said receiver is preferably located downstream from the gas generator, therefore at the rear of the turbine engine, as this is generally encountered on "open rotor" turbine engines.

Other advantages and features of the invention will become apparent in the non-limiting detailed description below.

BRIEF DESCRIPTION OF THE DRAWINGS

This description will be made with reference to the appended drawings wherein.

DETAILED DESCRIPTION OF PREFERRED EMBODIMENTS

Figure 1:
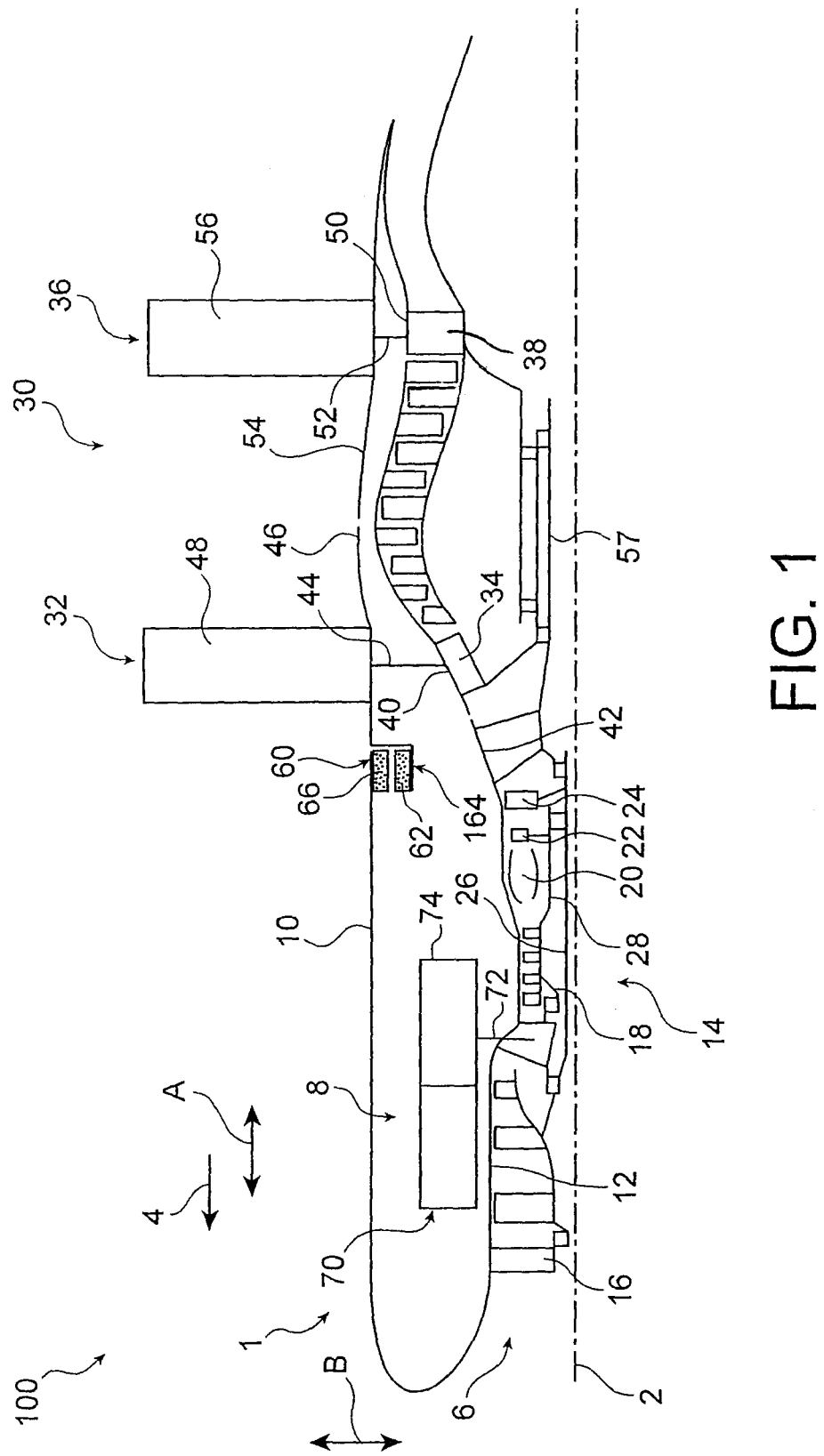
FIG. 1 illustrates a schematic view of a longitudinal half-section of a turbine engine for an aircraft, according to a first preferred embodiment of the present invention.

With reference to FIG. 1, a turbine engine 100 of the "open rotor" type may be seen, according to a first preferred embodiment of the present invention.

In the figures, the direction A corresponds to the longitudinal direction or axial direction, parallel to the longitudinal axis 2 of the turbine engine. The direction B, as for it, corresponds to the radial direction of the turbine engine. Further, the arrow 4 schematizes the forward movement direction of the aircraft under the action of the thrust of the turbine engine 100, this forward movement direction being opposite to the main gas flow direction within the turbine engine. The terms "front", "upstream", "rear", "downstream" used in the following description should be considered relatively to said forward movement direction 4.

In the front portion, the turbine engine has an air intake 6 continuing rearwards through a nacelle 8, the latter globally including an outer skin 10 and an inner skin 12, both of them centred on the axis 2 and radially shifted from each other.

The inner skin 12 forms an external radial case for a gas generator 14, comprising in a standard way, from the front towards the rear, a low pressure compressor 16, a high pressure compressor 18, a combustion chamber 20, a high pressure turbine 22 and an intermediate pressure turbine 24. The compressor 16 and the turbine 24 are mechanically connected through a shaft 26, thus forming a low pressure body, while the compressor 18 and the turbine 22 are mechanically connected through a shaft 28, forming a higher pressure body. Therefore, the gas generator 14 preferably has a standard design, a so-called dual body design.

Downstream from the intermediate pressure turbine 24 a receiver 30 is found, driven by a free power turbine. More specifically, in the preferred described embodiment, the receiver comprises two counter-rotating propellers, the first propeller 32, the most upstream, interdependently rotating with a first free power turbine 34, and the second propeller 36 interdependently rotating with a second free power turbine 38. If the solution of direct coupling has been retained between the free turbines and their respective propellers, a so-called "direct drive" design, an alternative solution in which a reduction gear would be interposed between each free turbine and its associated propeller may be contemplated, without departing from the scope of the invention. Also, a solution with a single propeller may also be contemplated.

Still referring to FIG. 1, it may be seen that the first power turbine 34, positioned downstream from the intermediate pressure turbine 24, has an outer case 40 which is located in the rear extension of a fixed outer case 42, itself laid out in the rear extension of the outer radial case 12 of the gas generator 14. Moreover, the cases 12 and 42 may be made in a single piece.

A flange or a plurality of arms 44 allows the propeller 32 to be offset radially outwards, the flange 44 having an internal radial end permanently integral with the outer turbine case 40, and an external radial end integral with an outer propeller case 46. The blades 48 protrude radially outwards from this case 46, one of the particularities of which is that it is found in the rear aerodynamic continuity of the outer nacelle skin 10.

Moreover, the second power turbine 38, also positioned downstream from the intermediate pressure turbine 24, has an outer case 50 which is located in the rear extension of the outer case 40 of the first turbine. In the illustrated preferred embodiment, both turbines are in fact nested in each other, the stages of the first turbine being alternately laid out with the stages of the second turbine in the A direction. Thus, the inner cases of both free turbines 34, 38 are also found in the extension of each other.

A flange or a plurality or arms 52 allows the propeller 36 to be offset radially outwards, the flange 52 having an internal radial end integral with the outer turbine case 50, and an external radial end integral with an outer propeller case 54. The blades 56 protrude radially outwards from this case 54, which is found in the rear aerodynamic continuity of the outer case 46 of the first propeller 32. This configuration is typical of an "open rotor" turbine engine.

As an indication, it is recalled that free turbines 34, 38 do not have any direct mechanical link with rotating components of the gas generator, i.e. they neither drive the elements 16, 18, 22, 24 nor are driven by them. Only the gases escaping from the intermediate pressure turbine 24 therefore ensure the setting of these free turbines 34, 38 into rotation, rotatably mounted on a fixed shaft 57 of the turbine engine.

One of the particularities of the present invention lies in the implementation of an electric power generator 60 at the receiver 30.

More particularly, in this first preferred embodiment, the rotor 62 of the generator 60 is mounted on an extension 164 of the outer case 46 of the propeller 32, at a front end of this case, this extension protruding forwards and radially inwards. Further, the stator 66 of the generator is laid out on a rear end of the outer nacelle skin 10 so as to be facing the rotor 62. In this first preferred embodiment the rotor 62 and stator 66, coaxial with and centred on the axis 2 are radially shifted from each other, thereby forming an electric power generator with axial flux. Of course, any design known to one skilled in the art may be used for making this axial flow generator.

This generator 60 is provided for electrically powering turbine engine and/or aircraft equipment such as for example lubrication and fuel systems, or any other conventional hydraulic or electrical system. The advantage related to the particular location of this generator 60 lies in the non-perturbation of the thermodynamic equilibrium of the gas generator 14. As such, provision may nevertheless be made, as this is known from the prior art, for an additional electric power generator 70, the rotor (not shown) of which is driven into rotation by a radial shaft 72 integral with the high pressure compressor 18, directly or via a gear box or reduction gear 74. Thus, the required electric power may be picked up at either one of the two generators 60, 70.

Finally, it is noted that one or more electric power generators may be implemented on the turbine engine, for example at the second free turbine 38.

Figure 2:
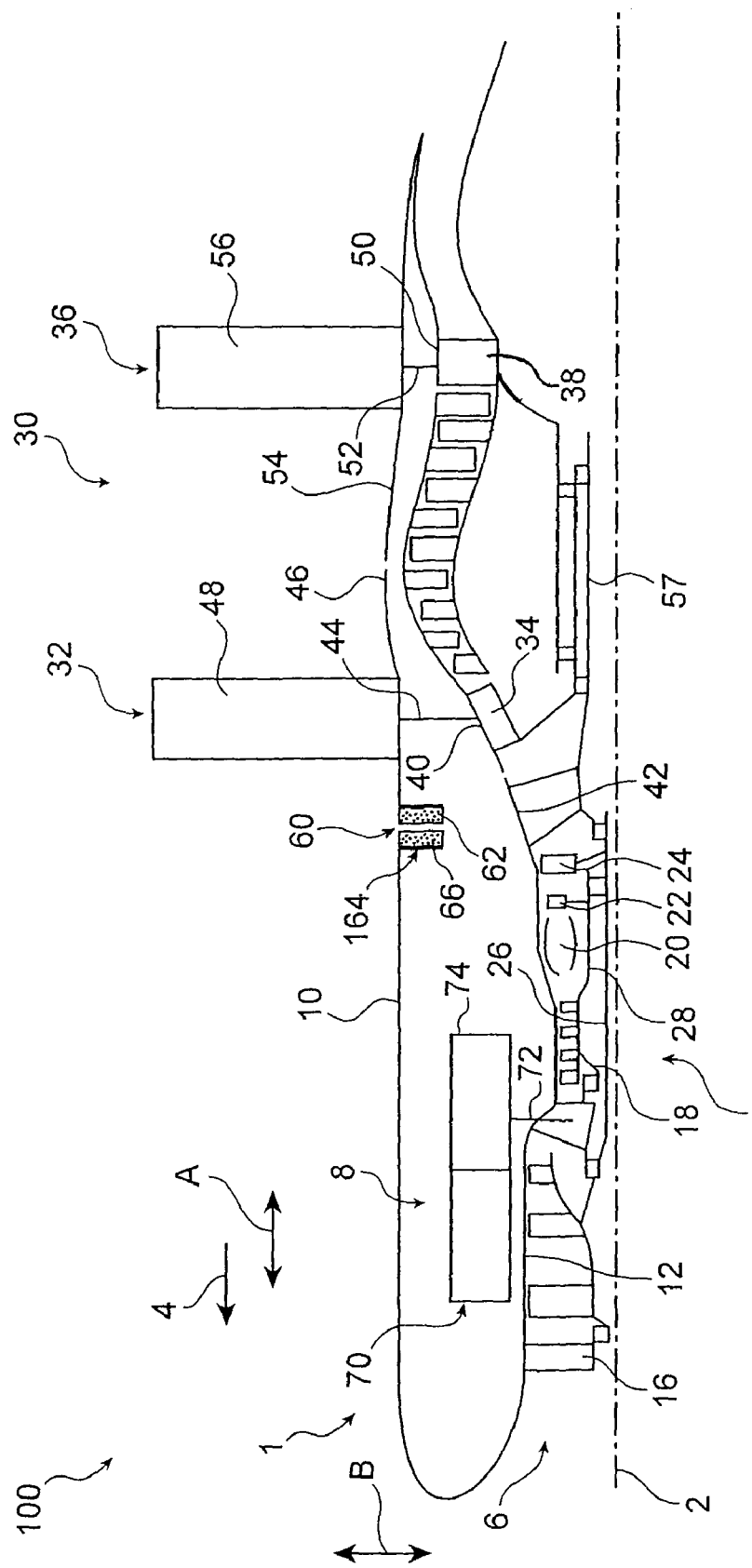
FIG. 2 is a similar view to that of FIG. 1, the turbine engine appearing as an alternative embodiment.

Referring now to FIG. 2, a turbine engine 100 similar to that of FIG. 1 may be seen, and appearing as an alternative embodiment.

In the figures, the elements bearing the same numerical references correspond to identical or similar elements. Therefore, it may be seen that only the design of the generator 60 is different with respect to the turbine engine 100 of FIG. 1. Indeed, the generator 60 positioned at the same location as in the embodiment of FIG. 1, shows an axial flow design.

The rotor 62 and the stator 66 are thus laid out facing each other, but shifted longitudinally form each other along the direction A, and no longer along the radial direction B. This configuration is preferred when the diameter or the rotor 62 and stator 66, coaxial with and centred on the axis 2, is large. Here also, any design known to one skilled in the art may be used for making this axial flux generator.

Of course, various modifications may be made by one skilled in the art to the invention which has just been described, only as non-limiting examples.

The invention claimed is:

1. A turbine engine for an aircraft comprising:
   a gas generator including a compressor, a combustion chamber and a turbine;
   a receiver; and
   a first free power turbine disposed downstream of the gas generator which drives said receiver, said first free power turbine including a first outer case,
   wherein the receiver includes a first propeller driven by the first free power turbine, said first propeller having a first propeller case radially located outwards relatively to said first outer case, blades which protrude radially outwards from the first propeller case, and an electric power generator including a rotor directly attached on said first propeller case and centered on the longitudinal axis of the turbine engine such that the rotor is driven into rotation by said first free power turbine.

2. The turbine engine according to claim 1, wherein said first propeller case is found in the aerodynamic continuity of an outer nacelle skin of said turbine engine, on which a stator of the generator is attached.

3. The turbine engine according to claim 1, wherein said electric power generator is with an axial or radial flow.

4. The turbine engine according to claim 1, wherein said receiver comprises a second propeller driven by a second free power turbine, the first and second propellers being counter-rotating.

5. The turbine engine according to claim 4, wherein each of the first and second propellers is driven by the first and second free power turbines, respectively, directly or via a reduction gear.

6. The turbine engine according to claim 1, wherein said gas generator is with a dual body.

7. The turbine engine according to claim 6, wherein the gas generator comprises a high pressure compressor equipped with a radial shaft which drives a rotor of an additional electric power generator.

8. The turbine engine according to claim 1, wherein said receiver is located downstream from the gas generator.

9. The turbine engine according to claim 1, wherein the rotor of the generator is directly attached on an extension of the first propeller case.

10. The turbine engine according to claim 9, wherein the extension of the first propeller case protrudes forwards and radially inwards.

11. The turbine engine according to claim 1, further comprising a first flange with an inner radial end integral with the first outer case and an external radial end integral with the first propeller case.

12. The turbine engine according to claim 4, wherein the second free power turbine includes a second outer case and the second propeller includes a second propeller case radially located outwards relatively to the second outer case.

13. The turbine engine according to claim 12, further comprising a second flange with an inner radial end integral with the second outer case and an external radial end integral with the second propeller case.

* * * * *